United States Patent Office 3,407,140
Patented Oct. 22, 1968

3,407,140
ANTIOXIDANT COMPOSITION COMPRISING A SYNERGISTIC MIXTURE OF A PHENOL AND CERTAIN SULFONES
Max Eugene Chiddix and David J. Tracy, Easton, and Vasant Shah, Bethlehem, Pa., assignors to GAF Corporation, a corporation of Delaware
No Drawing. Filed Aug. 5, 1966, Ser. No. 570,413
8 Claims. (Cl. 252—47.5)

ABSTRACT OF THE DISCLOSURE

As an antioxidant composition, a mixture of an alkyl hindered phenol antioxidant and a sulfone compound containing a thioethylenesulfone group, a 3-thio-substituted sulfolane, or a 3-thio-substituted benzo-2,3-dihydrothiophene-1,1-dioxide, and oxidizable organic materials containing such antioxidant composition.

This invention is directed to antioxidant compositions which may be used for stabilization of organic compounds which tend to deteriorate in storage or in use, due to oxidation or other such reactions. More particularly, the instant invention is directed to an antioxidant composition containing a phenolic compound and a sulfone compound.

It is well known that certain organic materials, such as lubricating oils, fuels, edible oils, elastomers, plastics, synthetic resins, etc., are adversely affected by oxygen, giving such undesirable results as formation of gum, discoloration, loss of physical properties such as tensile strength for resins or elasticity for elastomers, loss of potency, rancidity and/or odor. A number of patents have issued which are directed to the purposes of preventing oxidative deterioration by providing a means for extending the useful life of these materials by using various types of oxidation inhibitors. These known antioxidants vary in their effectiveness and by and large have the disadvantages of high cost. Thus, a continuous search goes on for antioxidants which are more effective in extending the life span of these organic materials, while at the same time decreasing cost.

An object of the present invention is to provide an antioxidant composition which results in a total antioxidant effect that is greater than the sum of the effects of each ingredient taken independently. A specific object of this invention is to provide an antioxidant composition comprising a phenolic antioxidant and a sulfone compound. A further object is to provide new stable compositions of matter by incorporating these novel antioxidant compositions into organic materials such as synthetic resins, plastics, fuels, lubricating oils, edible oils, elastomers, and other materials susceptible to deterioration due to oxygen or related degradation. Other objects of this invention will become more apparent as the disclosure proceeds.

The above objects may be readily accomplished by the preparation and use of a composite antioxidant composition comprising a sulfone compound and a phenolic antioxidant. While the use of phenolic compounds as antioxidants is not new, we have discovered that the addition of a sulfone compound to said phenolic antioxidants results in a surprising and totally greater effectiveness. While one would assume that their combination would result in an effectiveness that is equal to the arithmetical sum of their individual separate effects, we have discovered that their combined effectiveness is unexpectedly greater than the arithmetical sum of the two. In other words, by the addition of a sulfone compound a synergistic effect is obtained. Moreover, this synergism does not appear to be limited to specific combinations, but is broadly applicable to combinations of sulfone compounds with a phenolic antioxidant, combinations of phenolic compounds with a sulfone compound as well as combinations of both sulfone compounds with combinations of phenolic compounds.

More particularly, the instant invention may be defined as an antioxidant composition consisting essentially of a phenolic antioxidant and a sulfone compound selected from the group consisting of:

I. 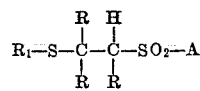

II. 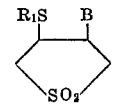

and

III. 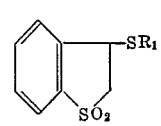

wherein $R_1$ represents an organic radical containing from $C_1$ to $C_{25}$ carbon atoms selected from the group consisting of alkyl, cycloalkyl, alkylaryl, aryl, benzyl, alkylbenzyl, benzothiazyl, and $-(CH_2)_n COOR_2$ radicals: wherein $n$ represents an integer from 1 to 4 inclusive and wherein $R_2$ represents an organic radical containing from $C_1$ to $C_{25}$ carbon atoms selected from the group consisting of alkyl and cycloalkyl radicals; wherein A represents an organic radical of $C_1$ to $C_{30}$ carbon atoms selected from the group consisting of alkyl, cycloalkyl, aryl, alkylaryl, benzyl, alkylbenzyl and

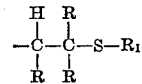

wherein R represents a radical selected from the group consisting of hydrogen and lower alkyl and wherein B represents a radical selected from the group consisting of hydrogen and $-SR_1$. Especially good results have been obtained wherein the sulfone compound is a compound represented by Formula I above, and A represents a radical of the formula

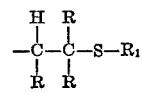

We have discovered that these sulfone compounds, when combined with phenolic compounds exhibit a synergistic effect which results in excellent oxidation inhibiting activity.

Said sulfone compound may be easily prepared by the base catalyzed reaction of a mercaptan with the appropriate sulfone. Examples of such reactions are depicted as follows:

(1) 

(2)

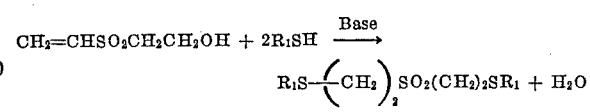

(3)
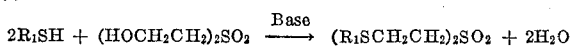
$$2R_1SH + (HOCH_2CH_2)_2SO_2 \xrightarrow{\text{Base}} (R_1SCH_2CH_2)_2SO_2 + 2H_2O$$

(4)
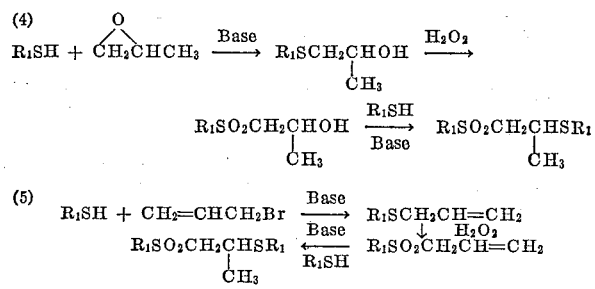
$$R_1SH + \overset{O}{\underset{}{CH_2CHCH_3}} \xrightarrow{\text{Base}} R_1SCH_2\underset{CH_3}{\overset{}{CHOH}} \xrightarrow{H_2O_2}$$

$$R_1SO_2CH_2\underset{CH_3}{\overset{}{CHOH}} \xrightarrow[\text{Base}]{R_1SH} R_1SO_2CH_2\underset{CH_3}{\overset{}{CHSR_1}}$$

(5)
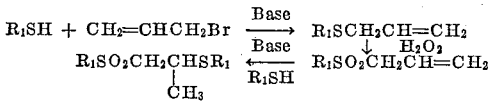
$$R_1SH + CH_2=CHCH_2Br \xrightarrow{\text{Base}} R_1SCH_2CH=CH_2$$
$$R_1SO_2CH_2CHSR_1 \xleftarrow{\text{Base}} R_1SO_2CH_2CH=CH_2 \; \downarrow H_2O_2$$
$$\underset{CH_3}{|}$$

They may also be prepared by free radical reactions, for example, (6)
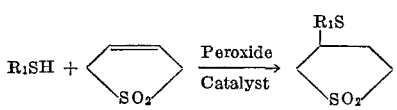

(7)
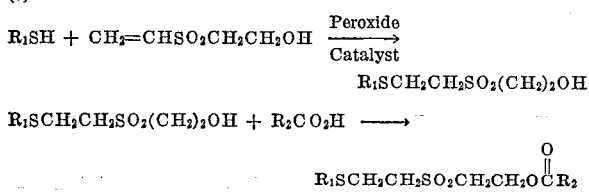
$$R_1SH + CH_2=CHSO_2CH_2CH_2OH \xrightarrow[\text{Catalyst}]{\text{Peroxide}}$$
$$R_1SCH_2CH_2SO_2(CH_2)_2OH$$

$$R_1SCH_2CH_2SO_2(CH_2)_2OH + R_2CO_2H \longrightarrow$$
$$R_1SCH_2CH_2SO_2CH_2CH_2O\overset{O}{\underset{}{\overset{\|}{C}}}R_2$$

In addition they may also be prepared by the displacement of a halogen by a mercaptan as shown as follows:

(8)
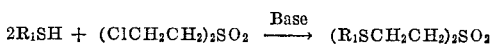
$$2R_1SH + (ClCH_2CH_2)_2SO_2 \xrightarrow{\text{Base}} (R_1SCH_2CH_2)_2SO_2$$

(9)
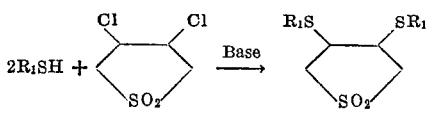

The base used in the above depicted processes may be any acid binder such as NaOH, Na$_2$CO$_3$, KOH, Ca(OH)$_2$, NH$_3$, tertiaryamine, pyridine, sodium hydride, sodium methoxide, potassium t-butoxide, or an alkylamine.

Representative examples of alkyl groups that may be mentioned when A or R$_1$ is alkyl include such radicals as: methyl, ethyl, n-propyl, isopropyl, butyl, isobutyl, t-butyl, amyl, hexyl, decyl, nonyl, n-dodecyl, branched dodecyl, 2-ethylhexyl, oxo octyl, oxo tridecyl, hexadecyl, octadecyl, behenyl, 1-methylcyclopentyl, cyclohexyl, 1-methylcyclohexyl, eicosyl, dodecenyl, oleyl, alkyl groups derived from fatty alcohols, from oxo alcohols, and from Ziegler process alcohols, alkyl groups obtained by the addition of hydrogen sulfide to olefins, to polyolefins such as tripropylene, tetrapropylene, tributylene, tetrabutylene, pentabutylene, hexabutylene, and to poly (mixed olefins) such as propylene-butylene polymer, and the like.

Examples of aryl groups useful when A or R$_1$ is aryl include phenyl, naphthyl, chlorophenyl, furyl, thiophenyl and other substituted aryl groups.

Among the alkylaryl groups that may be mentioned when A or R$_1$ is alkylaryl include xylyl, tolyl, ethylphenyl, propylphenyl, butylphenyl, isobutylphenyl, tert.-butylphenyl, hexylphenyl, octylphenyl, n-decylphenyl, isodecylphenyl, 1,1,3,3-tetramethyl-n-butyl phenyl, n-dodecylphenyl, branched dodecylphenyl, hexadecylphenyl, octadecylphenyl, 2,4-diisopropylphenyl, di-t-butylphenyl, dioctylphenyl, didodecylphenyl and phenyl alkylated with tetrapropylene, tributylene, tetrabutylene, hexabutylene, octadecene-1, tetradecene-1, dodecene-2, or dodecene-3, and the like.

Examples of alkylbenzyl groups when A or R$_1$ is alkylbenzyl include α-xylyl, dimethylbenzyl, ethylbenzyl, propylbenzyl, butylbenzyl, isobutylbenzyl, t-butylbenzyl, hexylbenzyl, octylbenzyl, nonylbenzyl, dodecylbenzyl, branched dodecylbenzyl, octadecylbenzyl, and the like.

Various examples of alkyl groups that are represented by R$_2$ in the formula —(CH$_2$)$_n$COOR$_2$ that may be mentioned include ethyl, isopropyl, butyl, isobutyl, cyclohexyl, 2-ethylhexyl, oxooctyl, octyl, n-dodecyl, branched dodecyl, tridecyl, hexadecyl, octadecyl, oleyl, and alkyl groups from fatty alcohols, from oxo alcohols, and from Zeigler process alcohols, and the like.

Typical examples of mercaptans useful as intermediates in preparing the sulfone antioxidant compounds of this invention include mercaptans having the following alkyl groups: methyl, ethyl, propyl, isopropyl, n-butyl, isobutyl, t-butyl, isoamyl, n-amyl, t-amyl, n-hexyl, 3-hexyl, n-heptyl, 2-methyl-2-hexyl, 2-ethylhexyl, 2-ethylbutyl, nonyl, decyl, dodecyl, branched dodecyl, tridecyl, tetradecyl, octadecyl, behenyl, and oleyl. Other useful mercaptans may be made by reacting hydrogen sulfide with olefins and polyolefins such as tripropylene, tetrapropylene, pentapropylene, hexapropylene, diisobutylene, triisobutylene, tetraisobutylene, mixed propenebutene and propeneisobutene polymers, 4,6,8-trimethyl-2-nonene, 5,7,7-trimethyl-1-octene, 2,4,6,6,8-pentamethyl-1-nonene, hexene-1, octene-1, dodecene-1, hexadecene-1, octadecene-1, and the like.

Other representative examples of mercaptans useful in preparing the sulfone antioxidant compounds of this invention include the following: 2,4,5,5,7-pentamethyl-1-octanethiol; 2,3,5,7-tetramethyl-3-nonanethiol; 2,4,7-trimethyl-2 - nonanethiol; 2,4,5,6,8 - pentamethyl-1-nonanethiol; 2,6,7-trimethyl-3-ethyl-1-octanethiol; 2,4,6,8-tetramethyl-1-nonanethiol; 2,3,5 - trimethyl - 4,7 - diethyl-1-octanethiol; 3,5-dimethyl-4,6-diethyl-1-heptanethiol; 3,4,5-trimethyl-4,6-diethyl-1-heptanethiol; 2-ethyl-3,5,7-trimethyl-1-octanethiol; 2-ethyl-4,6-dimethyl-1-octanethiol; 2,5,7,7-tetramethyl-1-octanethiol, 3,5,7,7-tetramethyl-1-octanethiol; 2,5-diethyl-3,7-dimethyl-1-octanethiol; 2,5,7,9-tetramethyl-1-decanethiol, and the like.

Phenolic compounds useful in this invention include any phenolic antioxidant, especially the alkyl hindered phenols, such as: 2-t-butylphenol, 2,4-di-t-butylphenol, 2,6-di-t-butylphenol, mixed butylated phenols, 2-t-butyl-p-cresol, 2,6-di-t-butyl-p-cresol, 2-sec.-butyl-p-cresol, 2-t-butyl-4,6-dimethylphenol, 2,4-di-t-amylphenol, 2,6-di-t-amylphenol, 2-tt-octyl-6-t-butyl-p-cresol, 2-tt-octylphenol (tt-octyl is 1,1,3,3 - tetramethylbutyl), 2,6-di-t-butyl-4-(branched) nonylphenol, 2,6-di-t-butyl-4-sec-hexylphenol, 2,6-di-t-butyl-4-tt-octylphenol, 2,4,6-tri-t-butylphenol, 2,4,6-tri-sec. butylphenol, 2,4,6-trisopropylphenol, 2,4,6-tri-t-amylphenol, 2,6 - di-t-butyl-4-methoxymethylphenol, 2,6-di-t-butyl-4-dimethyl-aminomethylphenol, and 2,6 - di-t-butyl-4-butylaminomethylphenol, and the like.

Methylenebis phenols are also quite useful in this invention especially the 4,4′-methylenebis (2,6-dialkylphenols) in which the alkyl groups are tert. alkyl groups of 4 to 8 carbon atoms. Examples of these and other methylenebis phenols include
4,4′-methylenebis (6-isopropyl-o-cresol);
4,4′-methylenebis (2-propyl-6-tert-butylphenol);
4,4′-methylenebis (2-ethyl-6-tert-amylphenol);
4,4′-methylenebis (2-hexyl-6-sec-butylphenol);
4,4′-methylenebis (6-(1,1,3,3-tetramethylbutyl)-o-cresol);
4,4′-methylenebis (2,6-di-tert.-butylphenol); also
4,4′-methylenebis (2,6-diisopropylphenol),
4,4′-methylenebis (6-tert-butyl-o-cresol),
2,2′-methylenebis (4-methyl-6-t-butylphenol),
2,2′-thiobis (4-methyl-6-t-butylphenol),
2,6-di-t-butyl-4-stearoyloxy-methylphenol,
ethylenebis [β-(3,5-di-t-butyl-4-hydroxyphenyl) propionate],
dioctadecyl-3,5-di-t-butyl-4-hydroxybenzylphosphonate,
cyanuric acid esters of 2,6-di-t-butylhydroquinone or of 2,5-di-t-butylhydroquinone, mixed cyanuric esters of fatty alcohols and 2,6-di-t-butylhydroquinone, mixed cyanuric esters and thioesters prepared from alkylmercaptans and 2,6-di-t-butylhydroquinone or 2,5-di-t-butylhydroquinone,
2,4,5-trihydroxybutyrophenone,
propyl gallate,
2,6-di-tert-butyl-α-dimethylamino-p-cresol,
4,4'-bis-(2,6-di-tert-butylphenol),
2,6-di-tert-butyl-α-methoxy-p-cresol,
4-hydroxymethyl-2,6-di-tert.-butylphenol,
1,3,5-trimethyl-2,4,6-tris [3,5-di-tert-butyl-4-hydroxybenzyl] benzene,
4,4'-butylidenebis (6-tert-butyl-m-cresol),
bis(3-methyl-4-hydroxy-5-tert-butylbenzyl) sulfide,
and the like.

Among the more preferred phenolic antioxidant compounds mentioned above are those containing a secondary or tertiary alkyl radical in a position ortho to the hydroxy group.

Representative examples of the more preferred sulfone compounds used in the instant invention include such compounds as:

β-t-butylthioethyl-t-butyl sulfone
β-n-dodecylthioethyl-n-dodecyl sulfone
β-t-dodecylthio-β'-t-octylthio diethyl sulfone
β-n-octadecylthioethyl-n-octadecyl sulfone
β-t-dodecylthiopropyl-t-dodecyl sulfone
β-n-dodecylthiopropyl-t-dodecyl sulfone
β-n-nonylthio-β'-phenylthio diethyl sulfone
β-propylthio-β'-o-tolylthio diethyl sulfone
β-hexylthio-β'-naphthylthio diethyl sulfone
β-n-dodecylthio-β'-cyclohexylthio diethyl sulfone
β-decylthio-β'-n-dodecylphenylthio diethyl sulfone
β-t-dodecylthio-β'-p-nonylphenylthio diethyl sulfone
β-t-butylthio-β'-benzylthio diethyl sulfone
β-hexadecylthio-β'-p-dodecylbenzylthio diethyl sulfone
β-nonylthio-β'-propylthio diethyl sulfone
β-cyclohexylthio-β'-dodecylthio diethyl sulfone
β-cyclohexylthio-β'-octadecylthio diethyl sulfone
β-cyclohexylthio-β'-phenylthio diethyl sulfone
β-cyclohexylthioethylcyclohexyl sulfone
β-p-nonylphenylthioethyl-p-nonyl phenyl sulfone
β-p-dodecylphenylthio-β'-dodecylthio diethyl sulfone
β-p-dodecylbenzylthioethyl-p-dodecylbenzyl sulfone
β-phenylthioethyl phenyl sulfone
β-phenylthio-β'-octadecylthio diethyl sulfone
β-o-tolylthioethyl nonyl sulfone
β-α-naphthylthioethyl-α-naphthyl sulfone
β-α-naphthylthio-β'-benzylthio diethyl sulfone
β-benzylthioethyl benzyl sulfone
Bis-β-n-dodecylthioethyl sulfone
Bis-β-t-dodecylthioethyl sulfone
Bis-β-n-octadecylthioethyl sulfone
Bis-β-t-octylthioethyl sulfone
Bis-β-(primary mixed) tridecylthioethyl sulfone
Bis-β-n-hexadecylthioethyl sulfone
Bis-β-t-butylthioethyl sulfone
Bis-β-(2-mercaptobenzothiazolyl) ethyl sulfone
Bis-β-phenylthioethyl sulfone
Bis-β-cyclohexylthioethyl sulfone
Bis-β-p-nonylphenylthioethyl sulfone
Bis-β-p-dodecylphenylthioethyl sulfone
Bis-β-benzylthioethyl sulfone
β-(2-benzothiazolyl)thioethyl dodecyl sulfone
Bis-β-(2-benzothiazolyl)thioethyl sulfone
β-(2-benzothiazolyl)-thioethyl phenyl sulfone
n-dodecyl 2-(2-t-dodecylthioethylsulfonyl)-ethyl mercaptoacetate
dioctyl ester of sulfonylbis ethylmercaptoacetic acid
di-tridecyl ester of sulfonylbis ethylmercaptopropionic acid
3,4-di-p-dodecylbenzylthio sulfolane
3,4-di-n-dodecylthio sulfolane
3-n-dodecylthio sulfolane
3-phenylthio sulfolane
3-benzylthio sulfolane
3-octadecylthio sulfolane
3-butylthio sulfolane
3-n-dodecylthiobenzo-2,3-dihydrothiophene-1,1-dioxide
3-p-nonylphenylthiobenzo-2,3-dihydrothiophene-1,1-dioxide
3-p-dodecylbenzylthiobenzo-2,3-dihydrothiophene-1,1-dioxide The amount of phenolic antioxidant and sulfone compound present in the antioxidant composition of this invention is not critical, for it is obvious that a different ratio may be optimum in each application. However, the ratios will fall within a range of about 1 to 100 parts by weight of sulfone compound to about 100 to 1 parts by weight of the phenolic compound. Ratios outside this range are certainly not intended to be excluded by this invention. What actually determines the specific ratio amounts of sulfone compound to phenolic antioxidant, whether the composition, per se, is added to the organic material to be protected, or whether the sulfone and phenolic compounds are added separately to the organic material to be protected, depends on a number of variables, for example, the particular sulfone and phenolic compounds used, the particular organic material that is to be protected as well as the ultimate use of the resultant protected material. It has been found that synergistic combinations range from about 0.01 to 5 parts by weight of a phenolic antioxidant and about 0.01 to 5 parts by weight of a sulfone compound, per 100 parts by weight of organic material. When such combinations are added to the various organic materials susceptible to oxidative deterioration, they will normally provide the basic antioxidant protection necessary. However, preferred synergistic combinations lie within the range of about 0.02 to 2 parts by weight of a phenolic antioxidant with about 0.02 to 2 parts by weight of a sulfone compound per 100 parts by weight of organic material, and these combinations produce excellent results.

The novel antioxidant compositions of this invention find utility in a large variety of applications that deal with organic materials susceptible to oxidative deterioration and related degradation. For example, the intsant antioxidant compositions show excellent antioxidant activity in synthetic resins, plastics, elastomers, edible oils, lubricating oils and fuels. Among the examples of plastics that may be protected against oxidative degradation by the novel antioxidant compositions of this invention are included such polyolefins such as poly (ethylene), poly-(propylene), poly(butene-1), poly(pentene-1), poly(3-methylbutene - 1), poly(hexene - 1), poly(4 - methylpentene-1), poly(4-methylhexene-1), poly(4,4-di-methylpentene-1), and copolymers of these olefin monomers such as poly(ethylene copropylene), and polymers from other polymerizable liquid ethylenically unsaturated monomers, and the like.

Other plastics and resins which may be protected against oxidation include poly(styrene), poly(methyl styrene), poly(acrylates), poly(methyl acrylates), poly(ethyl acrylates), poly(2-ethylhexylacrylate), polycarbonates, polyesters such as polyethylene terephthalate, polyphenylene oxide, polysulfones, polyimides, polyamides, poly-benzimidazoles), poly(acrylonitrile), poly(vinylchloride), poly(vinylacetate), poly(ethylene oxide), poly(propylene oxide), poly(methyl vinyl ether), poly(butyl vinyl ether), ketone-formaldehyde resins, indene resins, and the like.

Synthetic lubricants which can be protected include alkyl oxalates, malonates, succinates, glutarates, adipates, pimelates, suberates, azelates, sebacates, esters from polyols such as pentaerythritol, trimethylol propane, and sorbitol, alkyl esters of aliphatic monocarboxylic acids such as lauric, oleic, palmitic, stearic and behenic, and the like. Other lubricants include silicone lubricants such as polysiloxane oils and greases of the type poly-alkyl-, polyaryl, polyalkoxy, polyaryloxy such as polydimethoxyphenoxy siloxane, silicate ester oils such as tetraalkyloxy and tetraaryloxysilanes, and halogen substituted siloxanes, and the like as well as fluocarbon lubricants such as $\{CF_2CFCl\}_n$, where $n=$ an integer and polyalkylene glycol lubricants such as ethylene oxide-propylene oxide copolymers and phosphate esters such as.

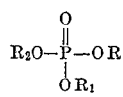

wherein R, $R_1$ and $R_2$ represent hydrogen, phenyl, alkyl phenyl or an alkyl radical such as butyl, octyl, lauryl, oleyl, palmityl and the like.

Examples of elastomers which may be protected against oxidation include natural rubber, EPT rubber, methyl rubber, SBR rubber, GR-S rubber, GR-N rubber, polybutadiene, cis-1,4-polyisoprene, neoprene rubber, butyl rubber, nitrile rubber, and chloroprene, and the like.

Hydraulic fluids and lubricants, industrial oils, automatic transmission fluids, (or simply) transmission fluids, crankcase lubricating oils, transformer oils, turbine oils, cutting oils, gear oils, white oils, glass annealing oils, hydrocarbon waxes, and the like, may also be protected. Other lubricants include synthetic base greases formed by mixing a soap with an oil, soaps derived from animal, vegetable fats, fatty acids, wool grease, rosin or petroleum acids, e.g., lead oleate, lithium stearate, and the like.

Fuels which may be protected by this invention include gasoline, jet fuel, diesel fuel, kerosine, and fuel oil, and the like.

In addition to the above, edible fats and oils may be protected such as oil, cod liver oil, safflower oil, castor oil, olive oil, sesame oil, peanut oil, babassu oil, palm oil, corn oil, oleomargarine, lard, butter, beef tallow, animal fat and hydrogenated shortening products such as Spry, Crisco and Snowdrift. However, adequate safe-guards and tests should first be carried out to be absolutely sure that the resultant compositions are not detrimental to humans or animals.

The novel synergistic antioxidant compositions of this invention may be added to the organic material that is to be preserved in any manner. For example, the antioxidant composition may be diluted with any suitable mutual solvent prior to use or added without dilution directly to the material that is to be protected. Moreover, the ingredients, i.e., sulfone compound and phenolic compound, of our novel antioxidant composition may, if one desires, be added separately to the material that is to be protected. Examples of suitable mutual solvents are propylene glycol, glycerine, glycerides, liquid fats, purified mineral oil, xylene, nonylbenzene, ethyl acetate, butyl acetate, methyl isobutyl ketone, etc.

For the purpose of convenience and economy the following examples are illustrative. It is to be understood that all parts, percentages and proportions referred to herein and in the appended claims are by weight unless otherwise indicated.

Examples I through XIX illustrate various methods that may be used for producing the sulfone compounds used in the instant antioxidant compositions.

Example I

Bis-$\beta$-n-dodecylthioethyl sulfone was prepared as follows: To 250 ml. of ethanol, there was added 9.2 grams of metallic sodium followed by 27.2 grams (0.2 mole) of vinyl $\beta$-hydroxyethyl sulfone under an atmosphere of nitrogen. To this solution, 40.0 grams (0.2 mole) of n-dodecanethiol in 100 ml. of ethanol was added. During the addition, the temperature rose from 27° to 35° C. The reaction mixture was then refluxed for a half hour, poured into 500 ml. of ice water, and filtered yielding 44.2 grams (85% yield) of the white solid sulfone product which had a melting point of 92° to 93.5° C. The infrared spectrum was transparent at 3500 cm.$^{-1}$ and exhibited strong bands at 1300 and 1110 cm.$^{-1}$.

*Analysis.*—Calcd.: C, 64.33; H, 11.18; S, 18.36. Found: C, 64.80; H, 11.55; S, 18.58.

Example II

Bis-$\beta$-tert-dodecylthioethyl sulfone was prepared as follows: To 750 ml. ethanol, there was added under $N_2$, 13.8 grams of metallic sodium followed by 33.3 grams (0.3 mole) of vinyl-$\beta$-hydroxyethyl sulfone. To this solution there was added over a 45 minute period, 120 grams (0.6 mole) t-dodecylmercaptan (a mixture of branched chain t-alkyl mercaptans). The reaction mixture was then refluxed for one and one half hours, cooled, neutralized with hydrochloric acid and extracted with ether. After removing the ether, the residue was concentrated by heating to 172° C. at 0.8 to 1.8 mm. of Hg. The residual oil, the sulfone product, weighed 106.7 grams, a 70% yield. The infrared spectrum was transparent in the 3500 cm.$^{-1}$.

*Analysis.*—Calcd.: C, 64.33; H, 11.58; S, 18.36; SH, 0. Found: C, 63.47; H, 11.38; S, 18.87; SH, 0.1.

Example III

Bis-$\beta$-n-octadecylthioethyl sulfone was prepared as follows: A solution of 56.2 grams (0.2 mole) of n-octadecylmercaptan in 250 ml. of methanol containing 15.8 grams sodium methoxide was prepared. To this solution was slowly added at room temperature, 13.6 grams (0.1 mole) vinyl-$\beta$-hydroxy ethyl sulfone, and after addition was complete the reaction mixture was refluxed for three hours. The reaction product was then poured into 500 ml. of ice water and the pH adjusted to about 7. The precipitated sulfone solid was recovered by filtration (67.3 g.; 96% of theory). After three crystallizations from carbon tetrachloride the sulfone had a melting point of 102–103° C. The infrared spectrum was transparent at 3500 cm.$^{-1}$ and exhibited bands at 1290, 1100 and 716 cm.$^{-1}$.

*Analysis.*—Calcd.: C, 69.50; H, 11.96; S, 13.92; SH, 0. Found: C, 70.43; H, 12.06; S, 14.23; SH, 0.7.

Example IV

Bis-$\beta$-p-nonylphenylthioethyl sulfone was prepared by following the procedure of Example II, employing in this instance the following:

Vinyl-$\beta$-hydroxyethyl sulfone (0.1 mole) _____ g__ 13.6
Methanol _____ ml__ 300
Sodium methoxide _____ g__ 10.8
p-Nonylthiophenol (0.2 mole) _____ g__ 47.2

53.5 grams (58% of theory) of the sulfone product was recovered as an oil.

*Analysis.*—Calcd.: C, 69.10; H, 9.21; S, 16.28; SH, 0. Found: C, 68.82; H, 9.24; S, 16.00; SH, 0.6.

Example V

Bis-$\beta$-dodecylbenzylthioethyl sulfone was prepared by following the procedure of Example II, employing in this instance the following:

Vinyl-$\beta$-hydroxyethyl sulfone (0.1 mole) _____ g__ 13.6
Methanol _____ ml__ 300
Sodium methoxide _____ g__ 10.8
p-Dodecylbenzylmercaptan (0.2 mole) _____ g__ 58.4

70.3 grams (98% of theory) of the sulfone product was recovered as an oil. The infrared spectrum showed bands at 1320 and 1110 cm.$^{-1}$.

*Analysis.*—Calcd.: C, 71.73; H, 10.03; S, 13.68. Found: C, 72.17; H, 10.31; S, 13.07.

Example VI

Bis-$\beta$-tert-octylthioethyl sulfone was prepared by following the procedure of Example II, employing in this instance no solvent but with the following:

Tert-octylmercaptan (0.4 mole) _____ g__ 58.4
Bis-β-hydroxyethyl sulfone (0.2 mole) _____ g__ 30.8
Sodium methoxide _____ g__ 5.0

The above reaction mixture was heated at 100° C. for 5 hours under nitrogen. 70.7 grams (87% of theory) of the sulfone product was recovered as an oil. The infrared spectrum showed bands at 1320 and 1110 cm.⁻¹.

*Analysis.*—Calcd.: C, 58.48; H, 10.31; S, 23.42; SH, 0.0. Found: C, 58.68; H, 10.32; S, 23.43; SH, 0.03.

Example VII

Bis-β-(primary mixed) tridecylthioethyl sulfone was prepared by following the procedure of Example II, employing in this instance no solvent but with the following:

Mixed p-tridecylmercaptan (0.2 mole) _____ g__ 43.2
Bis-β-hydroxyethyl sulfone (0.1 mole) _____ g__ 15.4
Sodium methoxide _____ g__ 5.0

The above reaction mixture was heated at 105–115° C. for 2.5 hours under nitrogen. 44.8 grams (81% of theory) of the sulfone product was recovered as a viscous oil. The infrared spectrum was transparent at 3500 cm.⁻¹ and exhibited strong bands at 1310 and 1130 cm.⁻¹.

Example VIII

Bis-β-n-hexadecylthioethyl sulfone was prepared by following the procedure of Example III employing in this instance the following:

Vinylhydroxyethyl sulfone (0.118 mole) _____ g__ 16.1
n-Hexadecyl mercaptan (0.23 mole) _____ g__ 61.0
Methanol _____ ml__ 300
Sodium methoxide _____ g__ 10.8

The above solution was refluxed for 4 hours. The yield of sulfone product was 72.4 g. (95% of theory) and had a melting point of 76–77° C.

Example IX

The lauric ester of beta-tert-dodecylthioethyl-β'-hydroxyethyl sulfone was prepared as follows: A solution of 33.8 grams (0.1 mole) of β-tert-dodecylthioethyl-β'-hydroxyethyl sulfone in 500 ml. of toluene containing 20.0 grams (0.1 mole) of lauric acid and 2.0 grams of p-toluene sulfonic acid was prepared. The solution was then refluxed for 6 hours and 1.6 ml. of water were azeotroped off. After washing with water the reaction mixture was concentrated, yielding 31.9 grams (52.08 g. theory) of the oily sulfone residue. The infrared spectrum was transparent in the 3500 cm.⁻¹ region and exhibited bands at 1740 and 1160 cm.⁻¹.

Example X

Bis-β-tert-butylthioethyl sulfone was prepared by charging a shaker bomb with 2-methyl-2-propanethiol (2.0 moles) _____ g__ 180
Bis-β-hydroxyethyl sulfone (1.0 mole) _____ g__ 154
Sodium hydroxide _____ g__ 16 and heated to 100° for 8 hours. The reaction mixture was then dissolved in ether and washed with a 10% hydrochloric acid, water and concentrated to yield 237 grams (80% of theory) of the white solid sulfone. Said solid sulfone had a melting point of 84.5 to 86° C. and the infrared spectrum exhibited bands at 1300 and 1100 cm.⁻¹, while the NMR showed bands at τ8.6(S) and τ6.9(m).

*Analysis.*—Calcd.: C, 48.28; H, 8.78; S, 32.22. Found: C, 48.39; H, 8.86; S, 32.35.

Example XI

Bis-β-(2-benzothiazolyl)thioethyl sulfone was prepared by following the procedure of Example II, employing in this instance the following:

2-mercaptobenzothiazole (0.2 mole) _____ g__ 33.4
Bis-β-hydroxyethyl sulfone (0.1 mole) _____ g__ 15.4
n-Butanol _____ ml__ 400
Potassium-t-butoxide _____ g__ 22.4

The above reaction mixture was refluxed at 110° C. for 5 hours under nitrogen affording 22.5 grams (50% of theory) of the sulfone product.

Example XII

The preparation of 3,4-di-p-dodecylbenzylthio sulfolane was conducted as follows: To 150 ml. of ethanol under nitrogen, 4.6 grams of metallic sodium was added followed by 58.4 grams (0.2 mole) dodecylbenzylmercaptan. To this solution was added a slurry of 18.9 grams (0.1 mole) of 3,4-dichlorosulfolane in 200 ml. of ethanol and the mixture refluxed for 4 hours. The pH was adjusted to 6 and the product after ether extraction and concentration yielded 67.3 grams of oily residue. This residue was then heated to 180° C. at 0.8 mm. of Hg to remove volatiles affording 61.3 grams (90% of theory) of the substituted sulfolane. The molecular weight by freezing point depression was 673 (Theory 701).

*Analysis.*—Calcd.: S, 13.72. Found: S, 13.60.

Example XIII 3,4-di-n-dodecylthio sulfolane was prepared by following the procedure of Example XII, employing in this instance the following:

3,4-dichlorosulfolane (0.1 mole) _____ g__ 18.9
1-dodecanethiol (0.2 mole) _____ g__ 40.4
Sodium methoxide _____ g__ 10.8
Methanol _____ ml__ 200
Reaction time: 5 hours.

A white solid sulfolane derivative weighing 49.1 g. and having a melting point of 69–73° C. was recovered.

Example XIV

To 27.4 grams (0.1 mole) of tridecylthioglycolate in 250 ml. of tetrahydrofuran under a nitrogen atmosphere was added 4.4 grams of 55% (0.1 mole) sodium hydride. To this solution was slowly added 9.4 grams (0.05 mole) of 3,4-dichlorosulfolane in 100 ml. of tetrahydrofuran. The solution was then refluxed for 4 hours and then concentrated yielding 33.7 grams of an oily residue. The oil was heated to 170° C. at 0.7 mm. of Hg leaving 21.9 grams (66% yield) of the sulfolane derivative shown below. The infrared spectrum exhibited bands at 1735, 1460, 1310 and 1120 cm.⁻¹, which is consistent with the following structure:

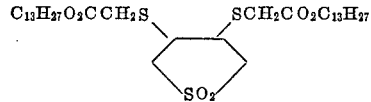

Example XV

The 3-n-dodecylthiosulfolane was prepared as follows: To 200 ml. of methanol was added 5.4 grams sodium methoxide and 11.8 grams (0.1 mole) sulfolene under a nitrogen atmosphere. To this solution was added over a 10 minute period 20.2 grams (0.1 mole) of 1-dodecanethio and the resultant mixture was refluxed for 6 hours. The reaction product was then poured into 500 ml. of ice water and neutralized with concentrated hydrochloric acid. Ether extraction and concentration yielded 20.0 grams (88% of theory) of the sulfolane as a white solid product which had a melting point of 36–38° C. The infrared spectrum exhibited bands at 1270 and 1130 cm.⁻¹, while the molecular weight by freezing point depression was 330 (Theory:320).

Example XVI

Beta-tert-dodecylthiopropyl-tert-dodecyl sulfone was prepared from t-dodecyl 2-hydroxypropyl sulfone [Reference: Marvel et al., J. Am. Chem. Soc. 76, 66 (1954)] and t-dodecyl mercaptan. To a solution of 5.4 g. NaOCH₃ in 300 ml. of methanol was added 14.6 grams (0.05 mole) of t-dodecyl 2-hydroxypropyl sulfone. To this solution was added 10.1 grams (0.05 mole) t-dodecylmercaptan. The reaction mixture was refluxed for 4 hours under nitrogen and then neutralized and extracted with ether. The ether layer was concentrated to yield 23.4 grams (63% of theory) of the instant sulfone product.

Example XVII

Beta-n-dodecylthio - 2 - methylpropyl tert-dodecyl sulfone was prepared by following the procedure of Example XVI, employing in this instance the following:

t-Dodecyl 2-hydroxy-2-methyl propyl sulfone (0.05 mole) _____g__ 15.3
n-Dodecyl mercaptan (0.05 mole) _____g__ 10.1
Potassium t-butoxide _____g__ 5.0 yielding 15.6 g. (85% of theory) of product. The product was not volatile at 132° C. and 0.8 mm. of Hg, and the infrared spectrum showed bands at 1300 and 1135 cm.⁻¹, while the NMR was transparent in the olefinic region.

*Analysis.*—Calcd.: C, 65.17; H, 8.75; S, 1740. Found: C, 64.68; H, 8.56; S, 17.25.

Examples I through XIX illustrate some of the various methods that may be used for producing the sulfone compounds used in the instant antioxidant compositions. It is obvious that other sulfones not specifically mentioned in the above examples may be made by similar processes.

Example XX

A series of antioxidant compositions was prepared by admixing in each case 1 part by weight of a sulfone compound with 2 parts by weight of a phenolic antioxidant. The various antioxidant compositions, that may be mentioned, were as follows:

| Composition | Phenolic Compounds | Sulfone Compounds |
|---|---|---|
| A | 4,4'-bis(2,6-di-t-butylphenol) | Bis-β-t-dodecylthioethyl sulfone. |
| B | 4,4'-methylenebis(2,6-di-t-butylphenol) | Do. |
| C | 2,6-di-t-butyl-p-cresol | Do. |
| D | 2,6-di-t-butylphenol | Do. |
| E | 2,4-di-t-butylphenol | Do. |
| F | 2,6-di-t-butyl-4-nonylphenol | Do. |
| G | 2,6-di-t-butyl-4-methoxymethyl phenol | Do. |
| H | 2,6-di-t-butyl-p-cresol | Bis-β-n-docecylthioethyl sulfone. |
| I | do | Bis-β-n-octadecyl-thioethyl sulfone. |
| J | do | Bis-β-p-dodecyl-benzylthioethyl sulfone. |
| K | do | 3,4-di-no-dodecyl-thio sulfolane. |
| L | do | 3,4-di-p-dodecyl-benzylthio sulfolane. |
| M | do | Product of Example XIV. |
| N | 2,4-dimethyl-6-t-butyl-phenol | Bis-β-t-dodecyl-thioethyl sulfone. |
| O | do | Bis-β-t-butylthio-ethyl sulfone. |
| P | 2-t-butylphenol | β-t-dodecyl-β'-(lauryl acid ester) dithioethyl sulfone. |
| Q | 2,6-di-t-butyl-p-cresol | Bis-β-(2-benzothia-zolyl)-thioethyl sulfone. |
| R | 2,6-di-t-butyl-4-tt-octylphenol | 3-n-dodecylthio-sulfolane. |
| S | 2,4,6-tri-t-amylphenol | β-n-dodecylthio-ethyl-n-dodecyl sulfone. |
| T | 2,6-di-t-butyl-4-butylamino-methylphenol | β-n-nonylthioethyl-β'-phenylthio diethyl sulfone. |
| U | 2,4-di-t-butyl phenol | β-t-butylthio-β'-benzylthio diethyl sulfone. |
| V | 4,4'-methylenebis-2,6-di-t-butylphenol | β-cyclohexylthio-β'-dodecylthio diethyl sulfone. |
| W | 2,6-di-t-butylphenol | β-phenylthioethyl phenyl sulfone. |
| X | 2,6-di-t-butyl-4-methoxy-methyl phenol | β-benzylthioethyl benzyl sulfone. |

A total of 3.4 grams of the sulfone product was obtained in the form of white crystals.

Example XVIII

A sulfolane derivative was prepared by following the procedure of Example XIV, employing in this instance the following:

Octadecyl-3-mercaptopropionate (0.1 mole) __g__ 35.8
Tetrahydrofuran _____ml__ 400
55% sodium hydride (0.12 mole) _____g__ 5.4
3,4-Dichlorosulfolane (0.05 mole) _____g__ 9.4

The yield of desired sulfolane product amounted to 40.4 grams (97% of theory) and had a melting point of 57–60° C. after crystallizing from acetone. The molecular weight by freezing point depression was 832 (theory:837) which is consistent with the following structure:

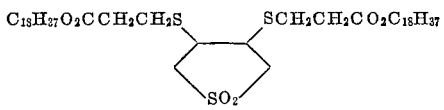

Example XIX

The preparation of 3-t-dodecylthiobenzo-2,3-dihydrothiophene-1,1-dioxide was conducted as follows: To a 500 ml. four-necked flask equipped with stirrer, condenser thermometer and nitrogen inlet was added 8.3 g. (0.05 mole) of benzothiophene-1,1-dioxide, 10.1 g. (0.05 mole) of t-dodecylmercaptan, and 200 ml. of methanol containing 2.7 g. of sodium methoxide. The reaction mixture was heated to reflux (65° C.) under nitrogen and maintained for 5.5 hours. After cooling to room temperature the reaction product was poured into 500 ml. of water and neutralized with concentrated hydrochloric acid. The product was extracted with 400 ml. of ether, dried over sodium sulfate and concentrated, In addition, another series of antioxidant compositions were prepared using 5 parts by weight of the sulfone compound with 1 part by weight of the phenolic antioxidant.

It should be pointed out that the above antioxidant compositions are merely representative and other antioxidant compositions may be similarly prepared by merely replacing the sulfone compound and/or phenolic compound with any other sulfone or phenolic compounds adequately described and named in the instant specification.

Test procedure

In order to demonstrate the increased antioxidant protection provided by our novel antioxidant compositions for lubricating oils, the standard Rotary Bomb Oxidation Test (ASTM D2272–64T) was used.

In this test, a series of runs were performed on a test oil containing as the antioxidant a sulfone compound, per se, a phenolic compound, per se, and then the novel antioxidant composition of both. The test was carried out as follows:

A sample of 50 g. of test oil containing the antioxidant, 5 ml. of distilled water and 10 ft. of No. 14 A.W.G. electrolytic copper wire wound in a coil with an outside diameter of 50 to 52 mm. were placed in a glass container. The glass container was then inserted in a chrome plated copper bomb and convered with a watch glass. Five ml. of distilled water were also added to the bomb outside the glass container to aid heat transfer when the bomb was placed in the heating bath. The bomb was then closed and sealed. A pressure gage was attached and the bomb was charged with oxygen to 90 p.s.i. and allowed to stand for 10 minutes to check for any leaks. The bomb was then placed on rotating stand in a heating bath and kept at 150° C. The bomb was tilted 30° from the horizontal and rotated at 100 r.p.m. Within 10 to 15 minutes the contents of the bomb attained the temperature of the bath and the pressure in the bomb increased from 90 p.s.i. to about 180 to 190 p.s.i. due to expansion of oxygen. The pressure of the bomb remained at this level for a certain time, the length of time depending on the effectiveness of the oxidation inhibitor in the test oil formulation, and then started to drop. The period from the time when the maximum pressure was attained to the time when the pressure had dropped by .25 p.s.i. from the maximum pressure, was reported as the induction period and served as a measure for the effectiveness of the oxidation inhibitor.

The oil used for this test in this and the following examples, was a solvent refined paraffinic oil having the following properties:

| | |
|---|---|
| Gravity ° API | 32.2 |
| Kinematic Visc. cst. | |
| 100° F. | 103 |
| 210° F. | 39.5 |
| VI | 95 |
| Pour pt., ° F. | 10 |
| Flash pt., ° F. | 380 |
| Color ASTM | 0.5 |
| Fire, ° F. | 430 |
| Neutralization value | Nil |
| Cu Corrosion, 212° F. | Neg. |

Example XXI

Bis-β-t-dodecylthioethyl sulfone and 4,4′-bis-2,6-di-t-butylphenol were evaluated as antioxidants for lubricating oils by the preceding test procedure. They were tested alone at 0.05 parts of sulfone compound per 99.95 parts of lubricating oil and 0.25 part of phenolic compound per 99.75 parts of lubricating oil and then in combination at 0.05 part and 0.25 part, respectively, per 99.7 parts of lubricating oil as a synergistic antioxidant composition. The results shown in the following table clearly demonstrate the synerigistic effect of the novel antioxidant composition of sulfone nd phenolic compound.

TABLE I

| Antioxidants | Conc., percent | Induction Time (min.) |
|---|---|---|
| 1. Bis-β-t-dodecylthioethyl sulfone | 0.05 | 32 |
| 2. 4,4′-bis-(2,6-di-t-butylphenol) | 0.25 | 102 |
| 3. Expected time (Sum of 1 and 2) | | 134 |
| 4. Actual time for antioxidant composition of 1 and 2 at the above concentrations | | 168 |

Example XXII

Example XXI was repeated except that 4,4′-methylene-bis(2,6-di-t-butylphenol) was used as the phenolic antioxidant instead of 4,4′-bis-(2,6-di-t-butylphenol). The results shown in the following table clearly demonstrate the synergistic effect of the novel antioxidant composition of sulfone and phenolic compound.

TABLE II

| Antioxidants | Conc., percent | Induction Time (min.) |
|---|---|---|
| 1. Bis-β-t-dodecylthioethyl sulfone | 0.05 | 32 |
| 2. 4,4′-methylenebis-(2,6-di-t-butylphenol) | 0.25 | 57 |
| 3. Expected time (Sum of 1 and 2) | | 89 |
| 4. Actual time for antioxidant composition of 1 and 2 at the above concentrations | | 126 |

Example XXIII

Example XXI was repeated except that various diverse phenolic antioxidants were used in place of 4,4′-bis (2,6-di-t-butylphenol). The results shown in the following tables demonstrate the synergistic effect of the novel antioxidant compositions of sulfone and various phenolic compounds.

TABLE III

| Antioxidants | Conc., percent | Induction Time (min.) |
|---|---|---|
| Example A: | | |
| 1. Bis-β-t-dodecylthioethyl sulfone | 0.05 | 32 |
| 2. 2,6-di-t-butyl-p-cresol | 0.25 | 130 |
| 3. Expected time (Sum of 1 and 2) | | 162 |
| 4. Actual time for antioxidant composition of 1 and 2 at the above concentrations | | 238 |
| Example B: | | |
| 1. Bis-β-t-dodecylthioethyl sulfone | 0.05 | 32 |
| 2. 2,6-di-t-butylphenol | 0.25 | 225 |
| 3. Expected time (Sum of 1 and 2) | | 257 |
| 4. Actual time for antioxidant composition of 1 and 2 at the above concentrations | | 390 |
| Example C: | | |
| 1. Bis-β-t-dodecylthioethyl sulfone | 0.05 | 32 |
| 2. 2,4-di-t-butylphenol | 0.25 | 86 |
| 3. Expected time (Sum of 1 and 2) | | 118 |
| 4. Actual time for antioxidant composition of 1 and 2 at the above concentrations | | 228 |
| Example D: | | |
| 1. Bis-β-t-dodecylthioethyl sulfone | 0.05 | 32 |
| 2. 2,4-di-t-butyl-p-nonylphenol | 0.25 | 37 |
| 3. Expected time (Sum of 1 and 2) | | 69 |
| 4. Actual time for antioxidant composition of 1 and 2 at the above concentrations | | 112 |
| Example E: | | |
| 1. Bis-β-t-dodecylthioethyl sulfone | 0.05 | 32 |
| 2. 2,6-di-t-butyl-p-α-methoxymethyl phenol | 0.25 | 58 |
| 3. Expected time (Sum of 1 and 2) | | 90 |
| 4. Actual time for antioxidant composition of 1 and 2 at the above concentrations | | 149 |

Example XXIV

In addition, the increased antioxidant protection provided by the instant novel antioxidant composition for lubricating oils is further demonstrated by the following test data obtained, using the Rotary Bomb Oxidation Test described in the foregoing Test Procedure with various weight ratios of bis-β-t-dodecylthioethyl sulfone and 2,6-di-t-butylphenol as the antioxidant composition. The test data are reported in the following table:

TABLE IV.—INDUCTION TIME (MIN.) FOR PHENOL CONCENTRATION

| Conc. of Sulfone | 0.05% | 0.125% | 0.25% | 0.5% | 0.75% | 1.0% |
|---|---|---|---|---|---|---|
| 0.0 | | | 235 | 270 | 390 | 430 |
| 0.025% | | | 270 | 370 | 395 | 455 |
| 0.05% | 50 | 230 | 390 | 405 | 425 | 455 |
| 0.1% | | 340 | 475 | 480 | 475 | 530 |

Similar results in stabilizing lubricating oil compositions may be obtained by replacing the above novel phenolic/sulfone antioxidants with various other antioxidants, for example, compositions such as J, K, M, P, Q, R, S, T, and W, disclosed in Example XX.

Example XXV

To illustrate the unusual synergistic antioxidant effect of the instant antioxidant compositions of this invention in protecting polypropylene, the standard oven oxidation test was used.

Various antioxidant systems were compounded into unstablized polypropylene on a Banbury type laboratory mill (Brabender Plastograph) at 183° C. for 10 minutes. A 40 mil thick sheet of compounded material was compression molded on a laboratory press (Carver) using 245° C. platen temperatures, 10,000 lbs. pressure on the 2¼ in. diameter ram, and a dwell time of 2 minutes. The sheets were air cooled under pressure before removal from the press. Standard microdumbell specimens (ASTM D 1708–59T) were die cut from the sheet. The specimens were suspended vertically in an air circulating oven operating at 300° F. Time to initial failure was noted as the exposure time required for the first signs of micro-cracking or crazing of the specimen. The time to final failure was noted as the exposure time required to produce breaking of the specimen when flicked with the finger.

Bis-β-n-dodecylthioethyl sulfone and 2,6-di-t-butyl-p-cresol were evaluated as antioxidants for polypropylene by the preceding procedure. They were tested alone at 0.5 parts per 100 parts of polypropylene and in combination as the novel antioxidant composition using 0.5 parts of each per 100 parts of polypropylene. The results shown in Table V clearly demonstrate the synergism of the combination.

TABLE V.—EFFECT OF ADDITIVES ON POLYPROPYLENE

| Additive | Conc., parts/ hundred | Hours to failure |
|---|---|---|
| 1. None | | 2 |
| 2. 2,6-di-t-butyl-p-cresol | 0.5 | 9 |
| 3. Bis-β-n-dodecylthioethyl sulfone | 0.5 | 111 |
| 4. Expected (Sum of 2 and 3) | | 120 |
| 5. Actual result with—2,6-di-t-butyl-p-cresol and Bis-β-n-dodecylthioethyl sulfone | { 0.5 0.5 } | 160 |

Example XXVI

Example XXV was repeated except that bis-β-n-octadecythioethyl sulfone was used in place of the bis-β-n-dodecylthioethyl sulfone. The surprising synergistic effect in increasing the hours of protection is shown in the following table:

TABLE VI.—EFFECT OF ADDITIVES ON POLYPROPYLENE

| Additive | Conc., parts/ hundred | Hours to failure |
|---|---|---|
| 1. 2,6-di-t-butyl-p-cresol | 0.5 | 9 |
| 2. Bis-β-n-octadecylthioethyl sulfone | 0.5 | 57 |
| 3. Expected (Sum of 2 and 3) | | 66 |
| 4. Actual result using—2,6-di-t-butyl-p-cresol and Bis-β-n-octadecylthioethyl sulfone | { 0.5 0.5 } | 245 |

Example XXVII

Example XXV was repeated except that various diverse sulfone compounds were used in place of bis-β-n-dodecylthioethyl sulfone. In every case the synergistic effect of the novel antioxidant compositions was observed as shown by the results in the following table:

TABLE VII

| Antioxidant | Conc., parts/ hundred | Hours to failure |
|---|---|---|
| Example A: | | |
| 1. Bis-β-t-dodecylthioethyl sulfone | 0.5 | 23 |
| 2. 2,6-di-t-butyl-p-cresol | 0.5 | 9 |
| 3. Expected time (Sum of 1 and 2) | | 32 |
| 4. Actual time for antioxidant composition of 1 and 2 at the above concentrations | | 72 |
| Example B: | | |
| 1. Bis-β-p-dodecylbenzylthioethyl sulfone | 0.5 | 113 |
| 2. 2,6-di-t-butyl-p-cresol | 0.5 | 9 |
| 3. Expected time (Sum of 1 and 2) | | 122 |
| 4. Actual time for antioxidant composition of 1 and 2 at the above concentrations | | 208 |
| Example C: | | |
| 1. 3,4-di-n-dodecylthio sulfolane | 0.5 | 27 |
| 2. 2,6-di-t-butyl-p-cresol | 0.5 | 9 |
| 3. Expected time (Sum of 1 and 2) | | 36 |
| 4. Actual time for antioxidant composition of 1 and 2 at the above concentrations | | 54 |
| Example D: | | |
| 1. 3,4-di-p-dodecylbenzylthio sulfolane | 0.5 | 171 |
| 2. 2,6-di-t-butyl-p-cresol | 0.5 | 9 |
| 3. Expected time (Sum of 1 and 2) | | 180 |
| 4. Actual time for antioxidant composition of 1 and 2 at the above concentrations | | 263 |
| Example E: | | |
| 1. Product of Example XIV | 0.5 | 48 |
| 2. 2,6-di-t-butyl-p-cresol | 0.5 | 9 |
| 3. Expected time (Sum of 1 and 2) | | 57 |
| 4. Actual time for antioxidant composition of 1 and 2 at the above concentrations | | 218 |

Similar results in stabilizing propylene compositions may be obtained by replacing the above novel phenolic/sulfone antioxidants with various other antioxidants, for example, compositions such as A, B, N, P, Q, R, S, V and X, disclosed in Example XX.

Example XXVIII

In order to demonstrate the increased protection against oxidation provided by our novel antioxidant compositions for liquid fuels such as gasoline, the standard ASTM D-525-55 test was used.

A sample of 50 cc. of test gasoline containing various antioxidants added on a percent by weight basis, were placed in a glass container and put into a stainless steel bomb, equipped with a recording pressure gauge. The bomb was charged with oxygen to obtain a pressure of 100 p.s.i. The whole assembly was placed in boiling water. The break point for this experiment was reached when a pressure drop of 2 p.s.i. had been observed in a 15 minute period succeeded by a pressure drop of more than 2 p.s.i. in a subsequent 15 minute period. This time was taken as the induction period and served as a measure of the stability of gasoline to oxidation. Thus, bis-β-t-dodecylthioethyl sulfone and 2,4-dimethyl-6-t-butylphenol were evaluated as antioxidants in gasoline by this procedure. They were tested alone at 0.005 parts of sulfone compound per 100 parts of gasoline and 0.01 parts of phenolic compound per 100 parts of gasoline and then in combination as a synergistic antioxidant composition using the same concentrations. A control run was also conducted on gasoline containing no antioxidant. The gasoline used in this example was a catalytic cracked gasoline and had the following physical properties:

| | |
|---|---|
| API, Gravity, °F. | 49.7 |
| Distillation, Initial BP °F | 108 |
| 5% | 134 |
| 10% | 148 |
| 20% | 168 |
| 30% | 192 |
| 40% | 224 |
| 50% | 258 |
| 60% | 292 |
| 70% | 324 |
| 80% | 358 |
| 90% | 396 |
| 95% | 416 |
| End point | 432 |
| Recovery, percent | 98% |
| Reid Vapor Pressure/100° F. lbs | 5.1 |

The results shown in the following table clearly demonstrate the synergistic effect of the novel antioxidant composition of sulfone and phenolic compound.

TABLE VIII

| Antioxidant | Conc., percent | Induction time (min.) |
|---|---|---|
| 1. None | | 280 |
| 2. Bis-β-t-dodecylthioethyl sulfone | 0.005 | 280 |
| 3. 2,4-dimethyl-6-t-butylphenol | 0.01 | 380 |
| 4. Expected time (Sum of 2 and 3) | | 380 |
| 5. Actual time for antioxidant composition of 2 and 3 at the above concentrations | | 410 |

Example XXIX

Example XXVIII was repeated except that bis-β-t-butylthioethyl sulfone was used in place of the bis-β-t-dodecylthioethyl sulfone compound. The results shown in the following table clearly demonstrate the synergistic effect of the novel antioxidant composition of sulfone and phenolic compounds:

TABLE IX

| Antioxidant | Conc., percent | Induction time (min.) |
|---|---|---|
| 1. None | | 280 |
| 2. Bis-β-t-butylthioethyl sulfone | 0.005 | 280 |
| 3. 2,4-dimethyl-6-t-butylphenol | 0.01 | 380 |
| 4. Expected time (Sum of 2 and 3) | | 380 |
| 5. Actual time for antioxidant composition of 2 and 3 at the above concentrations | | 405 |

Similar results in stabilizing liquid fuel compositions may be obtained by replacing the above novel phenolic-sulfone antioxidants with various other antioxidants, for example, compositions such as A, B, H, J, K, L, M, P, R, U, W and X, disclosed in Example XX.

Example XXX

A master batch was prepared in a Banbury mixer from pale crepe natural rubber which had been plasticated on a two roll mill. The following components made up the master batch by weight:

| | Parts |
|---|---|
| Plasticated pale crepe rubber | 100 |
| Permolite 40 M (lithophone) | 50 |
| Stanwhite 325 (whiting) | 50 |
| Protox 268 (zinc oxide) | 10 |
| Stearic acid | 1 |
| Santocure | 1 |
| Sulfur | 2.75 |
| Total | 214.75 |

A 50 part portion of the masterbatch was compounded on a two roll mill at 140° F. with 0.233 parts of bis-β-t-dodecylthioethyl sulfone and 0.233 parts of 2,2'-methylenebis 4-methyl-6-t-butylphenol. The compounded stock was then cured by heating portions of the final sheet in molds in a Clifton press at 292° F. Samples of the molded sheets were oven aged at 90° C.; from these aged specimens, tensile rings were cut for testing. An initial tensile value of 1740 p.s.i. was obtained and after 6 days aging at 90° C., 64% of this tensile strength was retained. A blank which had no phenol and sulfone added, retained only 18% of its initial tensile strength after the same oven aging treatment.

Various modifications and variations of this invention will be obvious to a worker skilled in the art and it is understood that such modifications and variations are to be included within the purview of this application and the spirit and scope of the appended claims.

We claim:
1. An antioxidant composition consisting essentially of an alkyl hindered phenol antioxidant and a sulfone compound selected from the group consisting of:

I 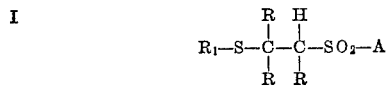

II 

and

III 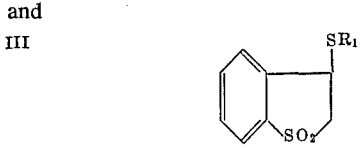

wherein $R_1$ represents an organic radical containing from $C_1$ to $C_{25}$ carbon atoms selected from the group consisting of alkyl, cyclo-alkyl, alkylaryl, aryl, benzyl, alkylbenzyl, benzothiazolyl, and —$(CH_2)_nCOOR_2$ radicals, wherein $n$ represents an integer from 1 to 4 inclusive and wherein $R_2$ represents an organic radical containing from $C_1$ to $C_{25}$ carbon atoms selected from the group consisting of alkyl and cycloalkyl radicals, wherein A represents an organic radical of $C_1$ to $C_{30}$ carbon atoms selected from the group consisting of alkyl, cycloalkyl, aryl, alkylaryl, benzyl, alkylbenzyl and

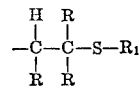

wherein R represents a radical selected from the group consisting of hydrogen and lower alkyl and wherein B represents a radical selected from the group consisting of hydrogen and —$SR_1$, wherein the weight ratio of phenolic antioxidant to sulfone compound lies within the range of about 1 to 100 parts of phenol with about 100 to 1 parts of sulfone.

2. An organic hydrocarbon material normally susceptible to oxidative deterioration protected against such deterioration by the inclusion therein of a small antioxidant quantity of an antioxidant composition as defined in claim 1.

3. The composition of claim 2, wherein the organic hydrocarbon material is a lubricating oil.

4. The composition of claim 2, wherein the organic hydrocarbon material is a polyolefin.

5. The composition of claim 2, wherein the organic hydrocarbon material is a natural rubber.

6. The composition of claim 2, wherein the organic hydrocarbon material is a liquid fuel.

7. An antioxidant composition as defined in claim 1, wherein the sulfone compound has the general formula:

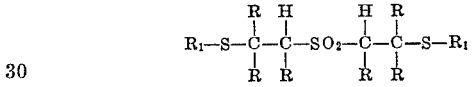

wherein $R_1$ represents an organic radical containing from $C_1$ to $C_{25}$ carbon atoms selected from the group consisting of alkyl, cycloalkyl, alkylaryl, aryl, benzyl, alkylbenzyl, benzothiazolyl and —$(CH_2)_nCOOR_2$ radicals, wherein $n$ represents an integer from 1 to 4 inclusive; wherein R represents a radical selected from the group consisting of hydrogen and lower alkyl; and wherein $R_2$ represents an organic radical containing from 1 to 25 carbon atoms selected from the group consisting of alkyl and cycloalkyl radicals.

8. An antioxidant composition, as defined in claim 1, wherein the sulfone compound is selected from the group consisting of bis-β-t-dodecylthioethyl sulfone, bis-β-n-dodecylthioethyl sulfone, bis-β-n-octadecylthioethyl sulfone, bis-β-p-dodecylbenzylthioethyl sulfone, and bis-β-t-butylthioethyl sulfone.

References Cited

UNITED STATES PATENTS

| | | | |
|---|---|---|---|
| 2,461,339 | 2/1949 | Morris et al. | 252—48.2 XR |
| 2,557,673 | 6/1951 | McKellin et al. | 252—48.2 XR |
| 2,627,511 | 2/1953 | Jones et al. | 252—48.2 |
| 2,677,617 | 5/1954 | Thompson | 252—406 XR |
| 3,043,775 | 7/1962 | Coffield et al. | 252—52 |
| 3,107,220 | 10/1963 | Morway | 252—52 XR |

DANIEL E. WYMAN, *Primary Examiner.*

W. H. CANNON, *Assistant Examiner.*

UNITED STATES PATENT OFFICE
CERTIFICATE OF CORRECTION

Patent No. 3,407,140  Dated October 22, 1968

Inventor(s) MAX E. CHIDDIX ET AL

It is certified that error appears in the above-identified patent and that said Letters Patent are hereby corrected as shown below:

Column 8, line 19, after "3500 cm.$^{-1}$" add -- region and exhibited strong bands at 1320 and 1125 cm.$^{-1}$ -- ; line 51, change "58%" to -- 48% --. Column 12, line 5, change "1740" to -- 17.40 -- ; in the table, under the heading "Sulfone Compounds", change "3,4-di-no-dodecyl-thio sulfolane" in composition K to -- 3,4-di-n-dodecyl-thio sulfolane -- . Column 14, line 48, after "T," insert -- V, -- .

SIGNED AND
SEALED

SEP 2 - 1969

(SEAL)
Attest:

Edward M. Fletcher, Jr.
Attesting Officer

WILLIAM E. SCHUYLER, JR
Commissioner of Patents